United States Patent
Fang et al.

(10) Patent No.: US 7,374,845 B2
(45) Date of Patent: May 20, 2008

(54) METHOD OF FORMING COLOR FILTER LAYER HAVING LIGHT-SCATTERING EFFECT

(75) Inventors: Szu-Yu Fang, Tainan County (TW); Chia-Hua Yu, Taipei County (TW); Tean-Sen Jen, Tao-Yuan Hsien (TW)

(73) Assignee: HannStar Display Corp., Wugu Industrial Zone, Taipei County (TW)

( * ) Notice: Subject to any disclaimer, the term of this patent is extended or adjusted under 35 U.S.C. 154(b) by 0 days.

(21) Appl. No.: 11/468,297

(22) Filed: Aug. 29, 2006

(65) Prior Publication Data

US 2008/0057416 A1    Mar. 6, 2008

(51) Int. Cl.
*G02B 5/20* (2006.01)
*G02F 1/1335* (2006.01)

(52) U.S. Cl. .......................................... 430/7; 430/330
(58) Field of Classification Search ..................... None
See application file for complete search history.

(56) References Cited

U.S. PATENT DOCUMENTS

2003/0147026 A1* 8/2003 Wachi ......................... 349/106

* cited by examiner

*Primary Examiner*—John A. McPherson
(74) *Attorney, Agent, or Firm*—Winston Hsu

(57) ABSTRACT

A method of forming a color filter layer having a light-scattering effect. First, substrate is provided, and a color filter layer is coated on the substrate. Then, an exposure-and-development process is performed to pattern the color filter layer. Subsequently, the color filter layer is post-baked to render the color filter layer a rough surface to provide the light-scattering effect, wherein the color filter layer has a surface roughness index Rz in the range of 0.5 to 2.0 μm.

21 Claims, 5 Drawing Sheets

METHOD OF FORMING COLOR FILTER LAYER HAVING LIGHT-SCATTERING EFFECT

BACKGROUND OF THE INVENTION

1. Field of the Invention

The present invention relates to a method of forming a color filter layer, and more particularly, to a method of forming a color filter layer having a rough surface that can provide light-scattering effect.

2. Description of the Prior Art

Liquid crystal display (LCD) panels are widely used as displays in electronic devices such as portable computers, PDAs, cell phones and flat TVs. Liquid crystal display panels can be simply classified into two types. One is transmissive type, and the other is reflective type. The former utilizes backlight as the light source and the latter utilizes ambient light. It is difficult to decrease the power consumption for the transmissive LCD due to the power requirements of the backlight. As for the reflective LCD, it has the advantage of power saving under bright ambient light; unfortunately, it cannot show images under dark ambient light.

In order to overcome the drawbacks of these two types of LCDs, a transflective LCD is disclosed. The transflective LCD can show images in not only transmissive mode but also reflective mode. Under bright ambient light, the backlight can be turned off, so the power consumption of the transflective LCD is lower than that of the transmissive LCD. In addition, under dark ambient light, the backlight can be turned on, so the image quality of the transflective LCD is better than that of the reflective LCD.

Please refer to FIG. 1. FIG. 1 is a sectional view of a conventional transflective LCD panel. As shown in FIG. 1, the conventional transflective LCD panel 10 includes a lower substrate 20 (also referred to as an array substrate), an upper substrate 30 (also referred to as a CF substrate), and a liquid crystal layer 40 interposed between the lower substrate 20 and the upper substrate 30. The transflective LCD panel 10 includes a plurality of pixel region 22, and each pixel region 22 can be divided in a reflection region 221 and a transmission region 222. The upper substrate 30 includes a plurality of color filters 32 corresponding to the pixel regions 22, and black matrices 34 disposed between the color filters 32.

The lower substrate 20 further includes a plurality of reflection electrodes 24 disposed in the reflection region 221, and a plurality of transmission electrodes 28 formed in the transmission region 222. In the reflection regions 221, each reflection electrode 24 is disposed on a bump structure 26 having a rough surface. The bump structure 26 renders the reflection electrode 24 a rough surface and this rough surface can provide a light-scattering effect on incident ambient light beams.

The conventional transflective LCD panel 10, however, suffers from some disadvantages. First, the color filters 32 are disposed on the upper substrate 30, and therefore cannot be perfectly aligned to the pixel regions 22 of the lower substrate 20. This causes reduction of aperture ratio of the conventional transflective LCD panel 10. In addition, one of the functions of the bump structure 26 is to form the rough surface of the reflection electrode 24. However, the bump structure 26 having a rough surface requires at least two patterning steps. One step is for forming the bump structure 26 in each reflection region 221, and the other step is for forming the rough surface. Therefore, the manufacturing cost is increased.

SUMMARY OF THE INVENTION

It is therefore one of the objects of the present invention to provide a method of forming a color filter layer having a rough surface with one exposure-and-development process.

To achieve the above object, a method of forming a color filter layer having a light-scattering effect is provided. First, substrate is provided, and a color filter layer is coated on the substrate. Then, an exposure-and-development process is performed to pattern the color filter layer. Subsequently, the color filter layer is post-baked to render the color filter layer a rough surface to provide the light-scattering effect, wherein the color filter layer has a surface roughness index Rz (ten-point mean roughness) in the range of 0.5 to 2.0 μm.

To achieve the above object, a method of forming a color filter layer having a light-scattering effect is provided. A substrate is provided, and a color filter layer is coated on the substrate. An exposure-and-development process is then performed to pattern the color filter layer, wherein the color filter layer has lower densities of cross-linking near the surface of the color filter layer. Following that, the color filter layer is post-baked to render the color filter layer a rough surface to provide the light-scattering effect.

To achieve the above object, a method of forming a color filter layer having a light-scattering effect is provided. First, a substrate is provided, and a color filter layer is coated on the substrate. The color filter layer includes surface cure initiators having a low photosensitivity. Then, an exposure-and-development process is performed to pattern the color filter layer. The color filter layer has lower densities of cross-linking near the surface of the color filter layer in the presence of the low photosensitivity of the surface cure initiators. Subsequently, the color filter layer is post-baked to render the color filter layer a rough surface to provide the light-scattering effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
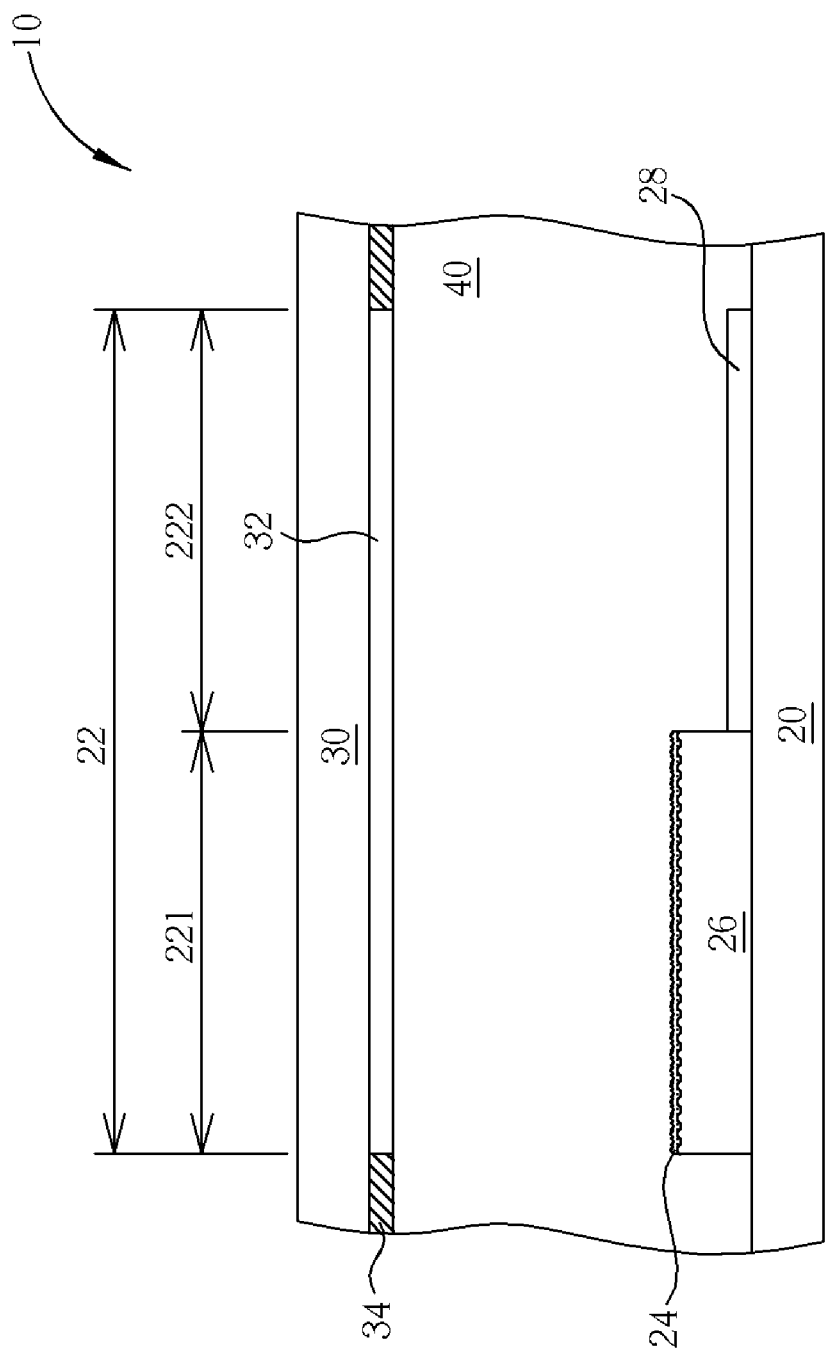
FIG. 1 is a sectional view of a conventional transflective LCD panel.
Figure 2:
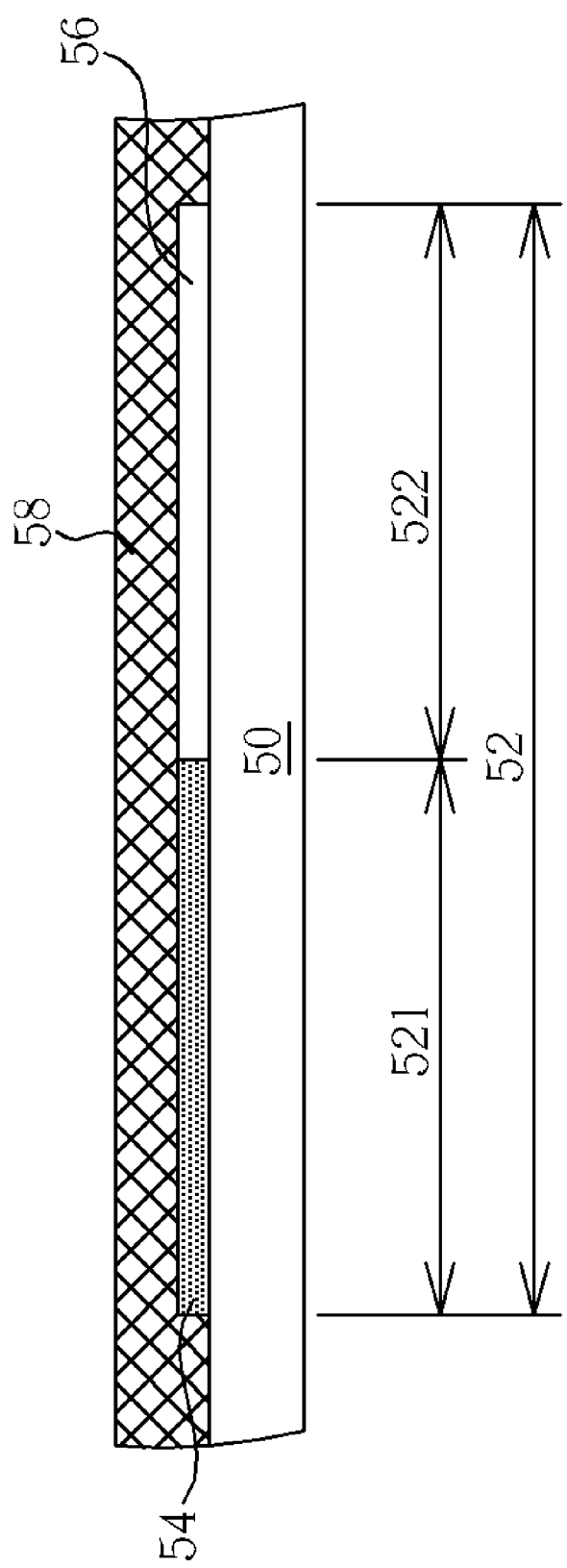
FIGS. 2-4 are schematic diagrams illustrating a method of forming a color filter layer having a light-scattering effect in accordance with a preferred embodiment of the present invention.
Figure 3:
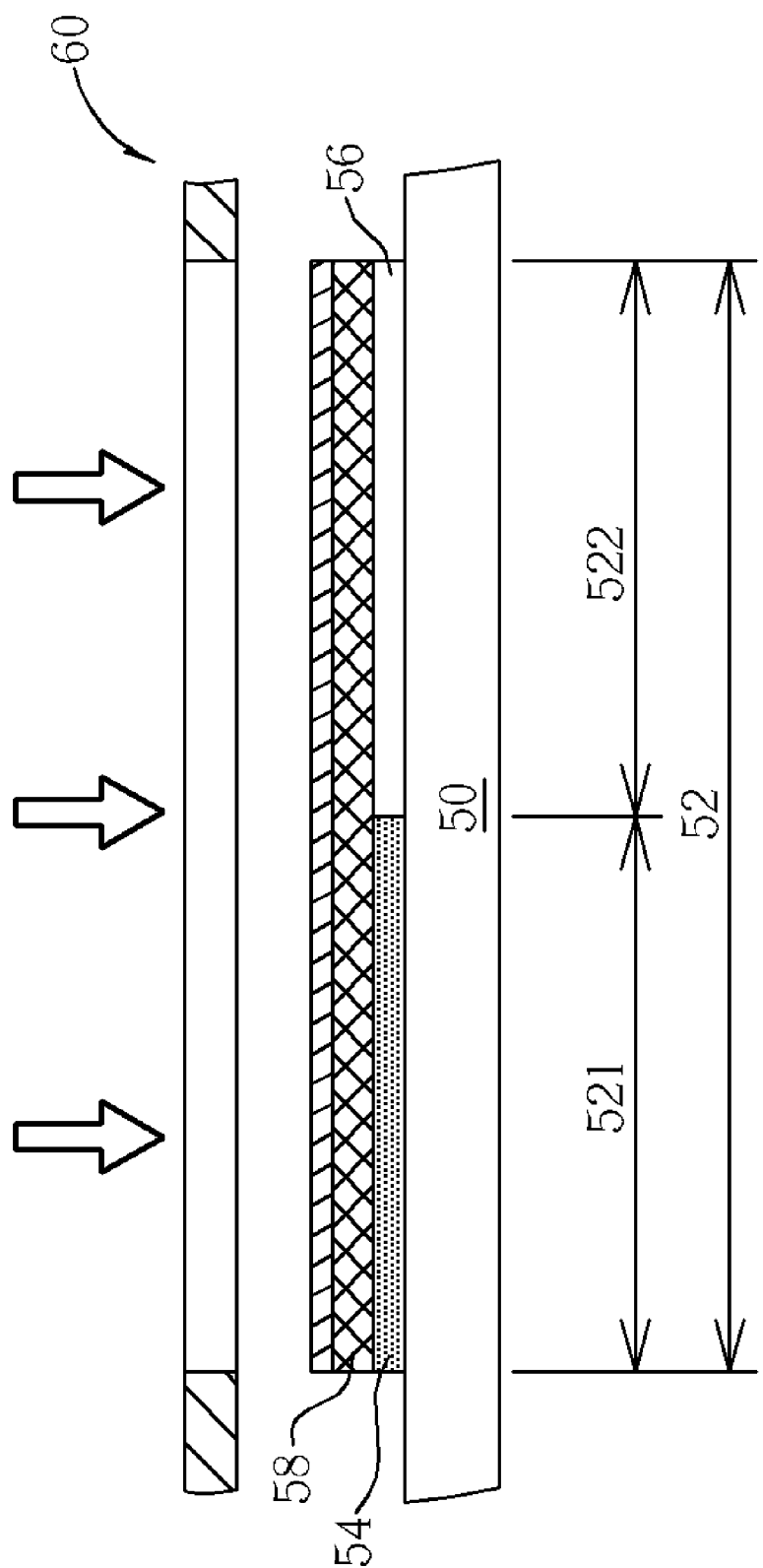
Figure 4:
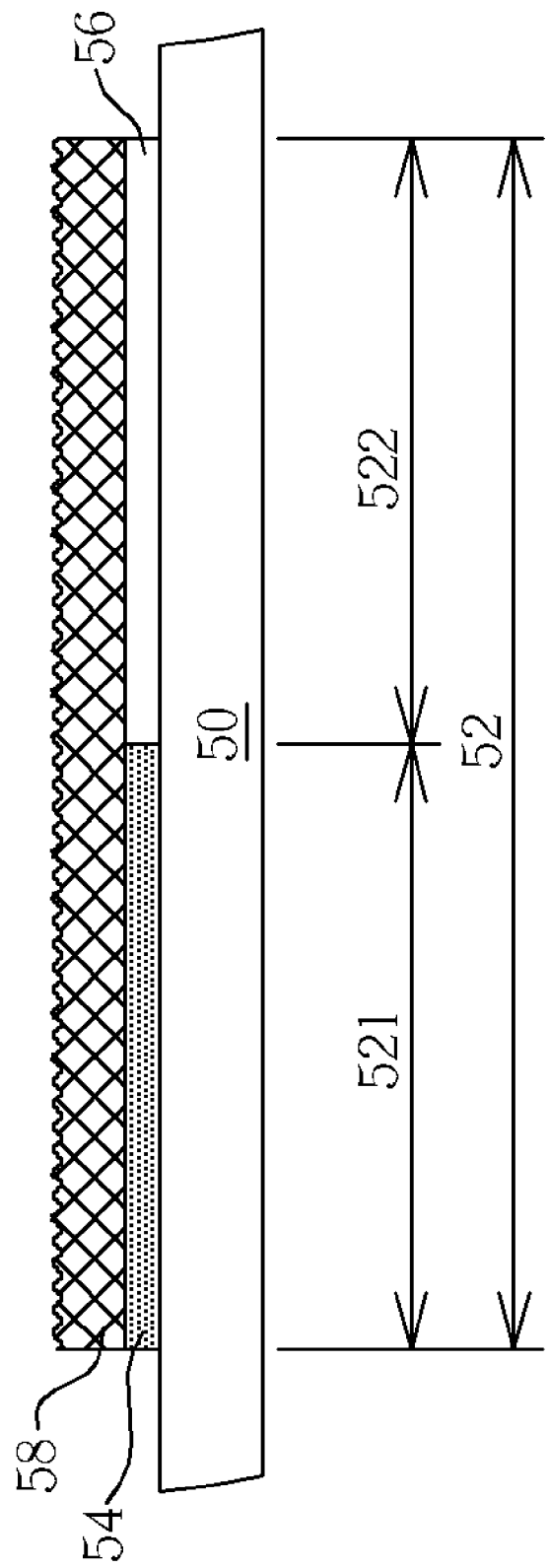

Please refer to FIGS. 2-4. FIGS. 2-4 are schematic diagrams illustrating a method of forming a color filter layer having a light-scattering effect in accordance with a preferred embodiment of the present invention. Please note that the color filter layer is incorporated into a color filter on array (COA) transflective LCD panel in this embodiment, but the method of the present invention is not limited. The color filter layer can be applied to any types of display panels. As shown in FIG. 2, an array substrate 50 of a transflective LCD panel is provided. The array substrate 50 includes a plurality of pixel regions 52, and each pixel region 52 is divided into a reflection region 521 and a transmission region 522. Normally the thickness of the liquid crystal layer (not shown in FIG. 2) is thinner in the reflection region 521 than in the transmission region 522. Each pixel region 52 further includes a thin film transistor (not shown), a reflection electrode 54 disposed in the reflection region 521, and a transmission electrode 56 disposed in the transmission region 522. A color filter layer 58 is then coated, for instance by spin coating, on the array substrate 50, and a pre-bake process is performed to pre-bake the color filter layer 58. The pre-bake process is used to preliminarily expel excessive solvents and water from the color filter layer 58 so as to enhance the adhesion between the color filter layer 58 and the array substrate 50.

As shown in FIG. 3, an exposure-and-development process using a photo mask 60 is performed to pattern the color filter layer 58. The color filter layer 58 of this embodiment includes pigment to filter undesired colors of incident light beams. For instance, if a red color filter layer is to be formed, red pigments can be added. For other color filter layers, such as green or blue color filters, green pigments or blue pigments can be added. The color filter layer 58 further includes resin, dispersants, monomers, initiators, solvents, and other additives. The function of the initiators is to initiate polymerization of the monomers when exposed to light beams with a certain wavelength (e.g. UV light). Accordingly, the exposed monomers will form cross-linking between each other and become rigid, while the unexposed color filter layer 58 will be resolved and removed when developed. Normally, the initiators can be classified into through cure initiators (e.g. MMMP) and surface cure initiators (e.g. HCPK). The through cure initiator is responsible for initiating polymerizations in the longitudinal (vertical) direction, while the surface cure initiator works to initiate polymerizations near the surface of the color filter layer 58. In this embodiment, the surface cure initiators have a low photosensitivity so that the cross-linking is insufficient near the surface of the color filter layer 58. The photosensitivity of the surface cure initiators can be reduced, for instance, by selecting low photosensitive surface cure initiators, or by using a trace amount of the surface cure initiator compared to a normal dosage. The low photosensitivity of the surface cure initiators leads to low densities of cross-linking in the upper portion of the color filter layer 58 when exposed, and this makes the upper portion of the color filter layer 58 wettish and loose compared to other portions of the color filter layer 58 after the exposure-and-development process.

As shown in FIG. 4, a post-bake process is performed to expel excessive solvents and water from the color filter layer 58. It is appreciated that the upper portion of the color filter layer 58 will shrink when heated due to the insufficient cross-linking, so that the surface of the color filter layer 58 will turn rough after the post-bake process. In a preferred embodiment, the ratio of the surface cure initiators to the through cure initiators prior to the exposure-and-development process in the color filter layer 58 is between the range of 0.2 and 0.6 by weight, and the ratio of the surface cure initiators to the through cure initiators subsequent to post-baking the color filter layer 58 is between the range of 0.22 and 0.58 by weight.

Figure 5:
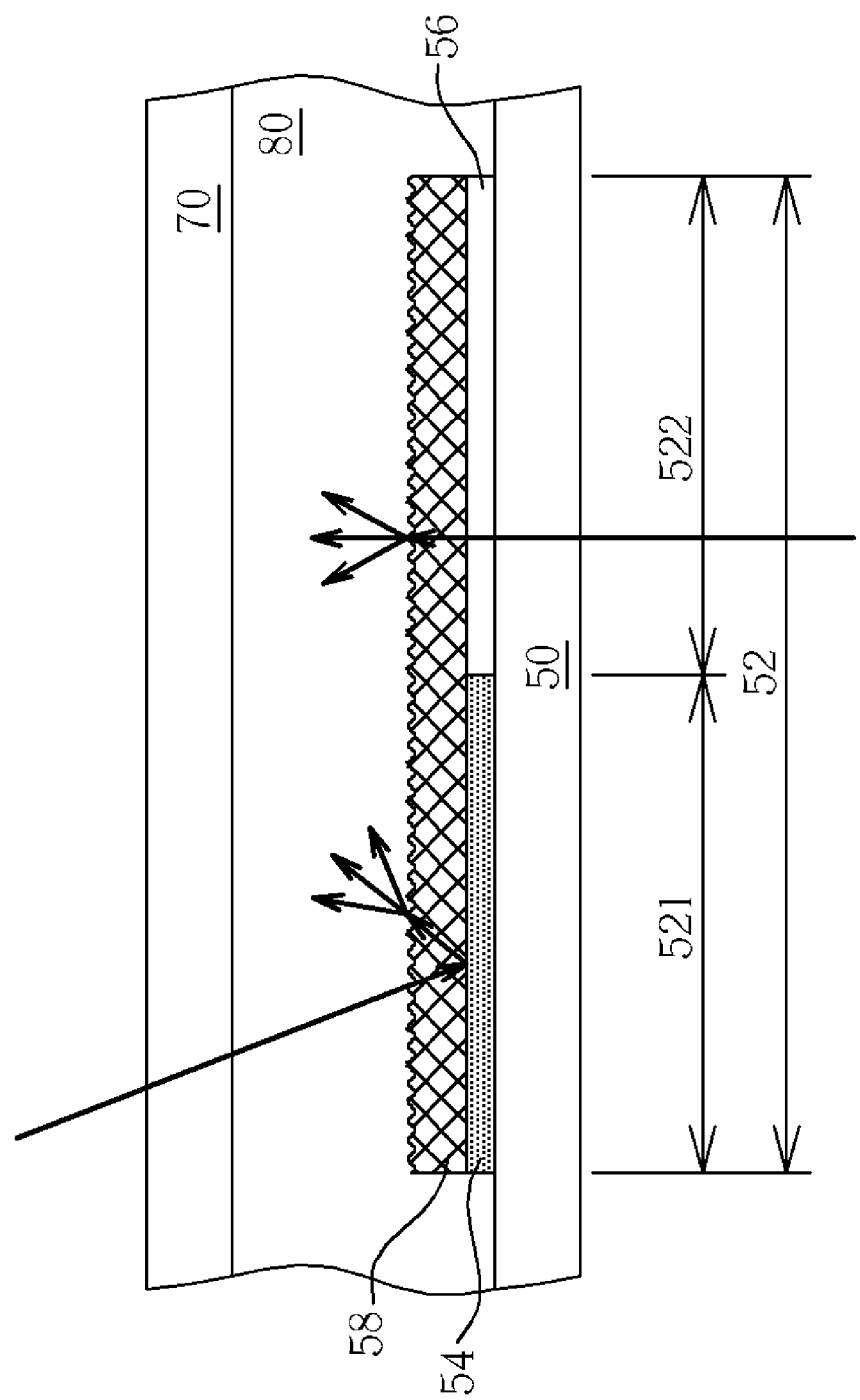
FIG. 5 is a schematic diagram of a transflective LCD panel incorporating the color filter layer shown in FIG. 4.

Please refer to FIG. 5. FIG. 5 is a schematic diagram of a transflective LCD panel incorporating the color filter layer shown in FIG. 4. As shown in FIG. 5, the array substrate 50 and a transparent substrate 70 are bonded, and a liquid crystal layer 80 is interposed there between. In the reflection region 521, ambient light beams are reflected by the reflection electrode 54, and scattered by the rough surface of the color filter layer 58. In the transmission region 522, back light beams will pass through the transmission electrode 56, the color filter layer 58, the liquid crystal layer 80, and the transparent substrate 70. When passing through the rough surface of the color filter layer 58, the back light beams will also be scattered. In this embodiment, the color filter layer 58 has a surface roughness index Rz (ten-point mean roughness) in the range of 0.5 to 2.0 μm. When the surface roughness index Rz is in this range, the optical scattering characteristics are good. Thus, the rough surface of the color filter layer 58 can exhibit a light-scattering effect in both the reflection region 521 and the transmission region 522.

It can be seen that the method of the present invention requires one exposure-and-development process to form color filters of a certain color (e.g. red, green or blue) in corresponding pixel regions of the array substrate, and also to form the rough surface that can scatter light beams in the same exposure-and-development process. It is appreciated that the method of the present invention is not limited to fabricate a color filter layer of a transflective LCD panel, and is applicable to any color filter structures of any display panels that require light-scattering function.

In conclusion, the color filter layer fabricated by the method of the present invention can provide color-filtering and light-scattering effects, and the color filter layer can be formed by one exposure-and-development process. As a result, the manufacturing cost can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of forming a color filter layer having a light-scattering effect, comprising:
   providing a substrate;
   coating a color filter layer on the substrate, wherein the color filter layer comprises through cure initiators, surface cure initiators and pigments, and the surface cure initiators comprise low photosensitive surface cure initiators;
   performing an exposure-and-development process to pattern the color filter layer; and
   post-baking the color filter layer to render the color filter layer a rough surface to provide the light-scattering effect, wherein the color filter layer has a surface roughness index Rz (ten-point mean roughness) in the range of 0.5 to 2.0 μm.

2. The method of claim 1, wherein the substrate is an array substrate of a transflective LCD panel.

3. The method of claim 1, wherein the ratio of the surface cure initiators and the through cure initiators in the color filter layer prior to performing the exposure-and-development process is substantially between 0.2 to 0.6 by weight.

4. The method of claim 1, wherein the ratio of the surface cure initiators to the through cure initiators subsequent to post-baking the color filter layer is between the range of 0.22 and 0.58 by weight.

5. The method of claim 1, wherein the pigments comprise red pigments, green pigments or blue pigments.

6. The method of claim 1, further comprising pre-baking the color filter layer prior to performing the exposure-and-development process.

7. A method of forming a color filter layer having a light-scattering effect, comprising:
   providing a substrate;
   coating a color filter layer on the substrate,
   performing only one exposure-and-development process to pattern the color filter layer, wherein the color filter layer has lower densities of cross-linking near the surface of the color filter layer; and
   post-baking the color filter layer to render the color filter layer a rough surface to provide the light-scattering effect.

8. The method of claim 7, wherein the color filter layer comprises through cure initiators, surface cure initiators and pigments.

9. The method of claim 8, wherein the lower densities of cross-linking near the surface is achieved by using a trace amount of surface cure initiators.

10. The method of claim 9, wherein the ratio of the surface cure initiators and the through cure initiators in the color filter layer prior to performing the exposure-and-development process is substantially between 0.2 to 0.6 by weight.

11. The method of claim 8, wherein the surface cure initiators comprise low photosensitive surface cure initiators.

12. The method of claim 11, wherein the lower densities of cross-linking near the surface is achieved by using the low photosensitive surface cure initiators.

13. A method of forming a color filter layer having a light-scattering effect, comprising:
   providing a substrate;
   coating a color filter layer on the substrate, the color filter layer comprising surface cure initiators, the surface cure initiators having a low photosensitivity;
   performing an exposure-and-development process to pattern the color filter layer, wherein the color filter layer has lower densities of cross-linking near the surface of the color filter layer in the presence of the low photosensitivity of the surface cure initiators; and
   post-baking the color filter layer to render the color filter layer a rough surface to provide the light-scattering effect.

14. The method of claim 13, wherein the low photosensitivity of the surface cure initiators is achieved by using low photosensitive surface cure initiators.

15. The method of claim 13, wherein the low photosensitivity of the surface cure initiators is achieved by using a trace amount of surface cure initiators.

16. The method of claim 13, wherein the substrate is an array substrate of a transflective LCD panel.

17. The method of claim 13, wherein the color filter layer further comprises through cure initiators and pigments.

18. The method of claim 17, wherein the ratio of the surface cure initiators and the through cure initiators in the color filter layer prior to performing the exposure-and-development process is substantially between 0.2 to 0.6 by weight.

19. The method of claim 17, wherein the ratio of the surface cure initiators to the through cure initiators subsequent to post-baking the color filter layer is between 0.22 and 0.58 by weight.

20. The method of claim 17, wherein the pigments comprise red pigments, green pigments or blue pigments.

21. The method of claim 13, further comprising pre-baking the color filter layer prior to performing the exposure-and-development process.

\* \* \* \* \*